Oct. 9, 1956    F. T. SMITH    2,765,721
TRACTOR IMPLEMENT LINKAGE
Filed May 24, 1951    2 Sheets-Sheet 1
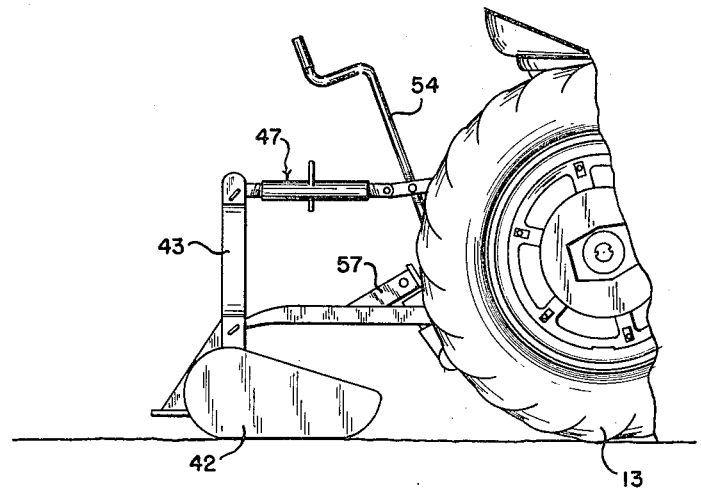
FIG.—1
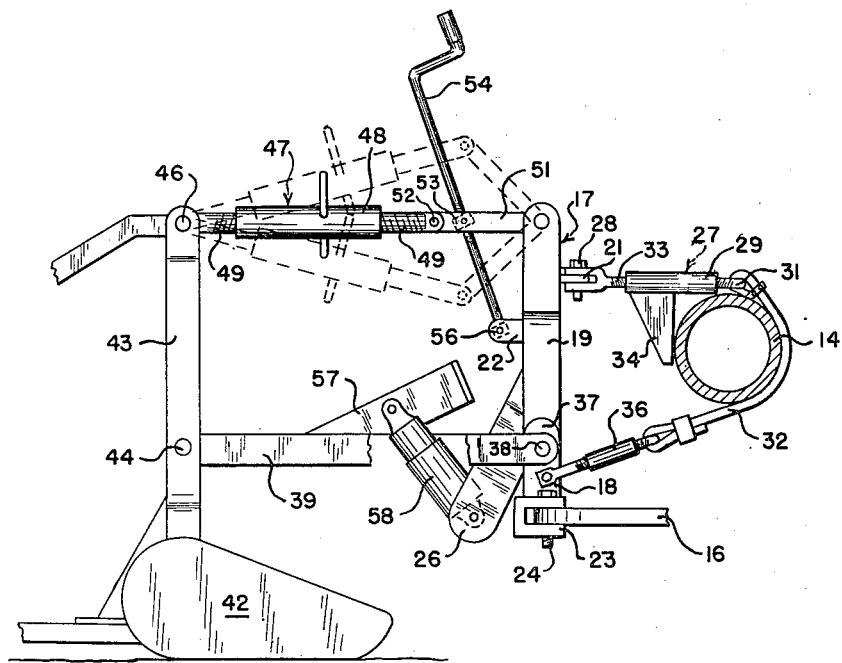
FIG.—2

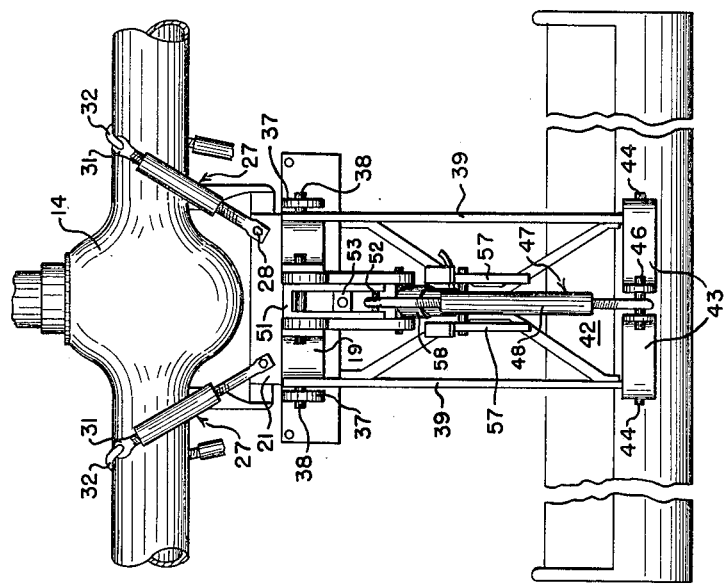
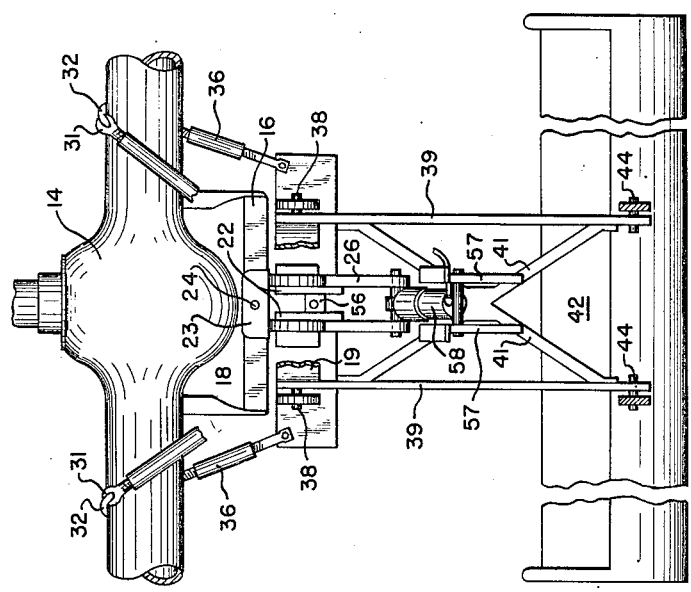

United States Patent Office 2,765,721
Patented Oct. 9, 1956

2,765,721

TRACTOR IMPLEMENT LINKAGE

Fred T. Smith, Golden, Colo., assignor, by mesne assignments, to The Calkins Manufacturing Company Application May 24, 1951, Serial No. 228,044

2 Claims. (Cl. 97—46.59)

My invention refers to apparatus for coupling soil-engaging implements to farm tractors and the like in such manner as to permit control of the action of the implement.

With respect to devices for securing implements, farm tractors may be divided into two groups, the first of which is generally known as the Ford-Ferguson, or three point system, and utilizes a pair of parallel spaced draft arms extending rearwardly from the tractor axle housing to the implement, and a third or upper arm connecting the implement with a control valve on the tractor, which in turn actuates hydraulic lifting arms connected to the draft arms.

The second and larger group of farm tractors utilizes a single point connection, usually in the form of a simple draw bar to which the implement is pivotally connected. In addition, this type of tractor frequently employs a hydraulic pump for supplying pressure fluid to cylinders, or the like, mounted on the implement. My invention is intended for use primarily with tractors of the second group, which do not incorporate means for lifting an attached implement.

An important object of my invention is to provide apparatus for coupling a soil-working implement to a tractor which is adjustable to vary the effect of vertical force components acting on the implement while in operation.

Another important object of my invention is to provide a linkage for coupling an implement requiring a three-point connection to a tractor having a single draft connection.

A further object of my invention is to provide a device for coupling a soil-engaging implement requiring connection to a tractor at three space points to a tractor having only a single point of connection in such manner that the vertical force components acting on the implement during operation may be regulated, that the angle of approach of the implement to the ground may be adjusted and the entire implement lifted from the ground at the will of the operator for movement along the road or the like.

Other important objects of my invention which refer to various components and combinations thereof will be apparent from the following description and from the appended drawings, in which:

Fig. 1 is a partially broken away elevation of my device secured to a tractor;

Fig. 2 is a partial elevation of my linkage, illustrating in detail the various components and positions of the load-regulating member;

Fig. 3 is a plan view of my device; and

Fig. 4 is a partial plan view of my device, the upper portion thereof broken away.

In brief, my device includes an upright member or frame for attachment at its lower extremity to a tractor drawbar. Turn buckles engage the lower extremity of the frame above the drawbar and are attached to flexible cables which extend around the tractor axle to rigid angularly disposed arms of adjustable length disposed above the tractor axle. The arms are pivotally secured to the upper portion of the frame and each includes a projecting ear disposed for engagement with the portion of the axles housing facing the frame member. Thus, when tension is applied to the cables by operation of the turn buckles, the frame is clamped rigidly to the tractor in an upright position.

An implement for attachment to my linkage, such as a scraper blade or a harrow, should include a rigid, upwardly extending yoke defining two laterally spaced points and a third point above the laterally spaced points to which arms are pivotally connected. Lower arms are pivotally secured to the frame in an approximately horizontal position, and the upper arm is pivotally secured to a clevis, which is in turn pivoted to the upper portion of the frame. A screw or the like is rotatably supported at one end by the frame and engages a nut pivoted to the clevis, thus permitting arcuate movement of the end of the clevis engaging the upper arm in a vertical plane when the screw is rotated. A jack, such as a hydraulic cylinder, is pivotally disposed between the frame and the lower arms for lifting the implement.

In operation, assuming the tractor to be moving forward and the implement in engagement with the soil, the rearward thrust against the implement places the lower arms of the linkage in tension and the upper arms in compression. If the clevis is moved upwardly until the pivot between the clevis and the upper arm is above a straight line connecting the upper pivot on the frame and the upper pivot on the implement yoke, the compressive force generated in the upper arm develops a downward component which resists the natural tendency of the implement to rise, the degree of resistance to upward movement of the implement being generally proportional within limits to the sign of the angle of the upper arm to the straight line.

When the clevis is moved downwardly beyond the straight line, an upwardly directed force component is developed in similar manner, this component opposing the weight of the implement and supplementing the natural tendency of the implement to rise. Since the implement will move upwardly when the downwardly directed force components are overcome, and since the components are, within limits, controlled by the position of the clevis, the linkage acts to limit the maximum load which can be developed by the implement, thus permitting the implement to rise over many obstructions, effectively preventing stalling of the tractor, and tending to make the work of the implement more uniform.

As indicated in Fig. 1, my device is intended for attachment to a conventional tractor at 10, having a frame 11, front wheels 12, rear wheels 13, a rear axle housing 14, and a drawbar 16 connected to frame 11 and disposed below and somewhat to the rear of the rear axle housing 14.

As shown more clearly in Fig. 2, a frame, generally designated 17, includes a base 18, usually of angle iron, a pair of upwardly extending yoke members 19, which extend inwardly towards each other and then upwardly parallel to each other to above the axle housing 14. The yoke members 19 are joined by a transverse bar 21 welded to the parallel portions of the yoke member, the bar 21 extending laterally beyond each of the members. Parallel cars 22 are secured to the yoke members 19 and extend rearwardly therefrom somewhat below the bar 21. A channel member 23 is welded or otherwise secured to the bottom of the base 18 and includes an opening for a pin 24 or that like by means of which the frame 17 is attached to the drawbar 16. Spaced support members 26 extend downwardly and rearwardly from the yoke members 19.

Arms, generally designated 27, are pivotally secured to the extremities of the bar 21, as by bolts 28, and diverge forwardly a distance sufficient to engage the upper surface of the axle housing 14. These arms 27 include a hollow member 29 having a threaded bore and an external terminal eye 31, to which a cable 32 is attached. A threaded member 33 engages a threaded bore of the hollow member 29 and is secured to the bar 21 by the bolts 28, the purpose of this arrangement being to permit lengthening or shortening of the arms 27, as required. Ears 34 are welded to the members 29 and project laterally for engagement with the surface of the axle housing 14 facing the frame 17. Turnbuckles 36 are pivotally secured to the base 18 above the channel 23 and to the cables 32.

Brackets 37 may be welded to the base 18 and extend upwardly near the base of the yokes 19, both the brackets 37 and the yoke members 19 being drilled to receive pins 38, which pivotally secure parallel lower arms 39 to the frame 17 in such position that the arms 39 are substantially horizontal when in use. Diagonal cross braces 41 are secured to and extend between the lower arms 39.

An implement such as a scraper blade, indicated at 42, includes an upwardly extending rigid yoke 43 defining spaced lower pivots 44 to which the lower arms 39 are secured in such position as to be approximately parallel to the ground when the implement is in use. The yoke 43 is also provided near its upper extremity with openings for a pivot pin 46, to which an upper arm generally designated 47 is pivotally secured. The upper arm 47 includes an internally threaded tubular body 48 into the ends of which oppositely threaded eye bolts 49 extend, thus permitting an increase or decrease in the length of the arm 47.

A clevis 51 is pivoted at one end to the upper portion of the frame 17 and is pivotally secured at its opposite end to the end of the arm 47 as by a pin 52. A nut 53 is pivotally secured to the clevis 51 and engages a threaded crank 54, the end of which is rotatably supported by a journal 56 pivotally supported between the ears 22. Stop arms 57 extend forwardly and upwardly from the cross braces 41 and are disposed for engagement with the frame 17 when the implement 42 has been elevated a predetermined distance. A jack 58, usually a hydraulic cylinder, is pivotally supported at one end by the support members 26, the opposite end of the cylinder pivotally engaging the stop arms 57 in such manner that actuation of the cylinder 58 is effective to lift the implement 42 from engagement with the ground.

Since the length of the arms 27 and the cables 32 are both adjustable, it becomes clear that the frame 17 may be rigidly secured in upright position to substantially any tractor having a drawbar without the use of special adaptor devices; and when so secured, provides means for coupling an implement requiring a three-point connection to a tractor of the type having only a single point connection.

As the tractor moves forwardly with the implement 42 in engagement with the ground, the resistance of the soil places the lower arms 39 in tension and the upper arm 47 in compression. However, as the pin 52 is raised from the full line position illustrated in Fig. 2, the compressional force exerted against the arm 47 develops a downward component which resists the natural etndency of the implement 42 to rise. Thus, by operation of the crank, 54, the apparent effective weight of the implement 42 may be increased. However, even when the pin 52 has been moved a substantial distance upwardly, the implement 42 will still rise from the soil when the forces tending to hold the implement down are exceeded, thus raising the implement from the soil and reducing the load to which the tractor is subjected.

Downward movement of the pin 52 below the position indicated by the solid lines in Fig. 2 generates an upward force component which supplements the natural tendency of the implement 42 to rise and which opposes the forces of gravity acting on the implement. It is therefore clear that the operator may by controlling the position of the pin 52 through operation of the crank 54, increase or decrease the maximum load to which the tractor may be subjected by the implement 42 and that when such load is exceeded the implement 42 will tend to move upwardly, thus reducing the load.

It is not essential that the tractor move forwardly, as indicated in Fig. 2, for my linkage to work in the manner described, since it is equally effective when the tractor is moved rearwardly and the scraper blade 42 reversed to act as a bulldozer blade. Under such circumstances, however, the lower arms 39 are placed in compression and the upper arm 47 is placed in tension, with the result that when the pin 52 is raised above a straight line connecting the pivot point 46 on the implement yoke 50 which secures the clevis 51 to the frame 17, the implement will tend to rise due to the generation of an upward force component. Downward movement of the pin 52 produces the reverse effect by generating a downward force component which urges the implement 42 into more positive engagement with the soil.

Although particularly adapted for use with a scraper blade, it should not be understood that other implements can not be substituted for the scraper blade, if desired.

For example, harrows, plows, and other implements of various sorts utilizing a three-point connection may be substituted as desired and with beneficial results. A triangular frame member and float of the type described in my Reissue Patent No. 23,190, dated January 10, 1950, may be attached to the scraper blade 42, thereby converting the scraper into an effective land leveler. Under such circumstances, the crank 54 is highly effective in regulating the sensitivity of the land leveler. Although arcuate movement of the pin 52 changes the angle of approach of the implement 42 to the ground, the change usually is not major and if desired can be corrected by lengthening or shortening the upper arm 47 by movement of the body 48.

I claim:

1. Apparatus for coupling a soil-engaging implement having an upright yoke to a tractor having a drawbar and a rear axle housing spaced upwardly from the drawbar comprising a rigid frame having a base and an upwardly extending portion, means for securing the base of the frame to the drawbar, laterally extending, angularly disposed arms on the upper portion of the frame for engagement with the rear axle housing, means for clamping said arms in abutting engagement with said axle housing, a pair of laterally spaced lower arms pivotally connected to the frame and to said yoke, a cross brace between the lower arms, a jack between the cross brace and the frame, an upper arm pivoted at one end to the implement yoke above the lower arms and including mating threaded members for varying the length of the arm, a clevis pivoted at one end to the upper portion of the frame and at its opposite end to an end of the upper arm and a rotatable threaded member engaging the clevis and the frame for raising and lowering the end of the clevis through an arc including an intermediate point at which the clevis and arm are in alignment.

2. Apparatus for coupling a soil-engaging implement having an upright yoke to a tractor having a drawbar and a rear axle housing spaced upwardly from the drawbar comprising a rigid upright frame, means for securing the frame to the tractor drawbar and rear axle housing, a pair of laterally spaced lower arms pivotally connected to the frame and said yoke, a cross brace between the lower arms, a jack between the cross braces and the frame, an upper arm pivoted at one end to the implement yoke above the lower arms and including mating threaded members for varying the length of the arm, a clevis pivoted at one end to the upper portion of the frame and at its opposite end to an end of the upper arm, and a rotatable threaded member engaging the clevis and the frame for raising and lowering the end of the clevis through an arc including an intermediate point at which the clevis and arm are in alignment.

References Cited in the file of this patent

UNITED STATES PATENTS

| | | |
|---|---|---|
| 1,501,652 | Ferguson | July 15, 1924 |
| 1,852,212 | Murphy | Apr. 5, 1932 |
| 1,864,639 | Crezee | June 28, 1932 |
| 1,916,945 | Ferguson | July 4, 1933 |
| 2,092,608 | Lindgren et al. | Sept. 7, 1937 |
| 2,190,347 | Austin | Feb. 13, 1940 |
| 2,354,886 | Silver | Aug. 1, 1944 |
| 2,455,727 | Bunting | Dec. 7, 1948 |
| 2,580,532 | Dugger | Jan. 1, 1952 |
| 2,616,349 | Lindeman et al. | Nov. 4, 1952 |
| 2,659,286 | Metzger | Nov. 17, 1953 |

FOREIGN PATENTS

| | | |
|---|---|---|
| 266,566 | Switzerland | May 1, 1950 |